United States Patent
Osada et al.

(10) Patent No.: US 6,955,491 B2
(45) Date of Patent: Oct. 18, 2005

(54) MARKING PEN WITH EXCELLENT CAP-OFF PERFORMANCE

(75) Inventors: Takahiro Osada, Gunma (JP); Suguru Yazawa, Gunma (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/451,426

(22) PCT Filed: Dec. 21, 2001

(86) PCT No.: PCT/JP01/11290

§ 371 (c)(1),
(2), (4) Date: Jun. 23, 2003

(87) PCT Pub. No.: WO02/051648

PCT Pub. Date: Jul. 4, 2002

(65) Prior Publication Data

US 2004/0067093 A1 Apr. 8, 2004

(30) Foreign Application Priority Data

Dec. 26, 2000 (JP) .................... 2000-395805
Dec. 26, 2000 (JP) .................... 2000-395806

(51) Int. Cl.$^7$ ............................... B43K 5/00
(52) U.S. Cl. ...................... 401/199; 401/198
(58) Field of Search ................. 401/198, 199, 401/196

(56) References Cited

U.S. PATENT DOCUMENTS 4,256,494 A    3/1981   Yamamoto et al.

FOREIGN PATENT DOCUMENTS

| GB | 2314852 A | 1/1998 |
| JP | 1-35028 B2 | 7/1989 |
| JP | 11-335612 A | 12/1999 |
| WO | 00/37265 A1 | 6/2000 |

*Primary Examiner*—David J. Walczak
(74) *Attorney, Agent, or Firm*—Buchanan Ingersoll PC

(57) ABSTRACT

A marking pen having an excellent cap-off performance which comprises at least a colorant, a solvent and a resin and, if necessary, an erasability-providing agent as ink components and in which a pen tip comprising a fibrous feed or a plastic feed is coated with a coating agent comprising a substance providing a cap-off property, wherein the above coating agent comprises petroleum waxes comprising hydrocarbons having side chains as a principal component (50% by weight or more). Preferably, the above petroleum waxes comprising hydrocarbons having side chains as a principal component have a melting point of 63° C. or lower and are solid at room temperature.

20 Claims, 3 Drawing Sheets

MARKING PEN WITH EXCELLENT CAP-OFF PERFORMANCE

TECHNICAL FIELD

The present invention relates to a marking pen having an excellent cap-off performance which has a good writing performance even after the pen tip is left standing in the air for a long period of time.

BACKGROUND ART

A marking pen in which an ink is penetrated into a pen tip comprising a fibrous feed or a plastic feed so as to be writable has so far been used in many cases.

However, when a cap of such marking pen is taken away to leave a pen tip part standing in the air for long time, there involved is the problem in that the pen tip part is dried to cause inferior writing.

In the past, in a marking pen which is excellent in a cap-off performance of inhibiting drying at the pen tip, higher fatty acid esters of polyglycerin were added to inks (Japanese Patent Publication S62-34352/1987); paraffin waxes which can be deposited on the surface of a pen tip to form a thin film were added to inks (Japanese Patent Publication H01-35028/1989); hexaglyceryl tristearate was added to inks (Japanese Patent Application Laid-Open No. H02-232277/1990); and lecithin was added to inks (Japanese Patent No. 2594457).

However, many of additives having a high vaporization-inhibiting effect has a low solubility (10% by weight or less) in ink solvents and has a problem in terms of this low solubility. In particular, the solubility in the vicinity of 0° C. is low (5% by weight or less), whereby there involved are the problems in that precipitations of the additives described above are produced in the inks while pens are stored at a low temperature or exposed repeatedly to low and high temperatures, thereby causing clogging in the ink passages to reduce the writing property or deteriorate the cap-off property with the passage of time. Thus, the effective vaporization-inhibiting effect is not yet achieved.

Accordingly, the present inventors have filed a patent application for writing instruments such as a marking pen, a felt-tip pen and a writing brush pen having an excellent cap-off performance in which a pen tip comprising a fibrous feed or a plastic feed is coated with a substance providing a cap-off property (PCT Publication No. WO2000/37265).

These writing instruments in which a pen tip comprising a fibrous feed or a plastic feed is coated with a substance providing a cap-off property are excellent in a cap-off property but are not yet satisfactory, and it is the existing situation that writing instruments having a further better cap-off property are required.

Further, in marking pens for a writing board such as markers for a white board among marking pens, those in which pen tips comprising a fibrous feed or a plastic feed are coated with petroleum waxes such as paraffin wax as a substance providing a cap-off property have had a problem in terms of a little bad cap-off property as compared with other marking pens than those for a writing board in which pen tips are coated with petroleum waxes such as paraffin wax as a substance providing a cap-off property.

In light of the problems on the conventional techniques described above, the present invention intends to solve them, and an object thereof is to provide a marking pen having an excellent cap-off performance which provides a good writing performance even after the pen tip is left standing in the air over a long period of time.

DISCLOSURE OF THE INVENTION

Intensive investigations of the problems on the conventional techniques described above have resulted in finding that in a marking pen for a writing board, the cause of providing a low cap-off performance of petroleum waxes such as paraffin wax has something to do with a solubility thereof in an erasability-providing agent added as an ink component for the marking pen for a writing board. That is, it has been found that petroleum waxes comprising linear hydrocarbons having no side chains as a principal component among substances providing a cap-off property have a large solubility in an erasability-providing agent and therefore film formation is inhibited by the erasability-providing agent, so that the cap-off performance is deteriorated. On the other hand, it has been found that petroleum waxes comprising hydrocarbons having side chains as a principal component have a small solubility in an erasability-providing agent and therefore the erasability-providing agent exerts a small effect to film formation and that because of a low crystallinity thereof, the waxes are uniformly spread when forming a coating film in a marking pen in which a pen tip comprising a fibrous feed or a plastic feed is coated with a substance providing a cap-off property to form the coating film having no gaps, so that obtained is a marking pen meeting the object described above which can achieve a good cap-off property.

Further, it has been found that also when adding petroleum waxes comprising hydrocarbons having side chains as a principal component as an ink component for a marking pen without coating a pen tip comprising a fibrous feed or a plastic feed with a coating agent comprising a substance providing a cap-off property, a coating film having no gaps can be formed on the pen tip without reducing the writing performance and that a marking pen which can achieve a good cap-off performance is obtained.

That is, the present invention comprises the following items (1) to (7).

(1) A marking pen having an excellent cap-off performance which comprises at least a colorant, a solvent and a resin as ink components and in which a pen tip comprising a fibrous feed or a plastic feed is coated with a coating agent comprising a substance providing a cap-off property, wherein the coating agent described above comprises petroleum waxes comprising 50% by weight or more of hydrocarbons having side chains.

(2) A marking pen having an excellent cap-off performance comprising at least a colorant, a solvent and a resin as ink components and having a pen tip comprising a fibrous feed or a plastic feed, wherein petroleum waxes comprising 50% by weight or more of hydrocarbons having side chains are involved in the ink components.

(3) The marking pen having an excellent cap-off performance as described in the above item (1) or (2), wherein the petroleum waxes comprising 50% by weight or more of hydrocarbons having side chains described above have a melting point of 63° C. or lower and are solid at room temperature.

(4) A marking pen for a writing board having an excellent cap-off performance, wherein in the marking pen as described in any of the above items (1) to (3), an erasability-providing agent is further involved as the ink component, and the colorant is a pigment.

(5) The marking pen for a writing board having an excellent cap-off performance as described in the above item (4), wherein the erasability-providing agent described above is at least one selected from substances having an alkyl group having 4 or more carbon atoms.

(6) The marking pen for a writing board having an excellent cap-off performance as described in the above item (4) or (5), wherein the erasability-providing agent has a vapor pressure of 0.1 mm Hg or less at 20° C.

BEST MODE FOR CARRYING OUT THE INVENTION

The embodiments of the present invention shall be explained below in details.

The marking pen having an excellent cap-off performance in the first invention of the present invention is a marking pen which comprises at least a colorant, a solvent and a resin as ink components and in which a pen tip comprising a fibrous feed or a plastic feed is coated with a coating agent comprising a substance providing a cap-off property, wherein the coating agent described above comprises petroleum waxes comprising hydrocarbons having side chains as a principal component.

Also, the marking pen having an excellent cap-off performance in the second invention of the present invention is a marking pen comprising at least a colorant, a solvent and a resin as ink components and having a pen tip comprising a fibrous feed or a plastic feed, wherein petroleum waxes comprising hydrocarbons having side chains as the principal component are involved in the ink components described above.

Further, also included as one embodiment of the present invention is a marking pen for a writing board which comprises an erasability-providing agent as a ink component and in which a pigment is used for the colorant in the first invention and the second invention each described above.

When the "present invention" is hereinafter referred to, it involves the first invention and the second invention each described above.

Figure 1:
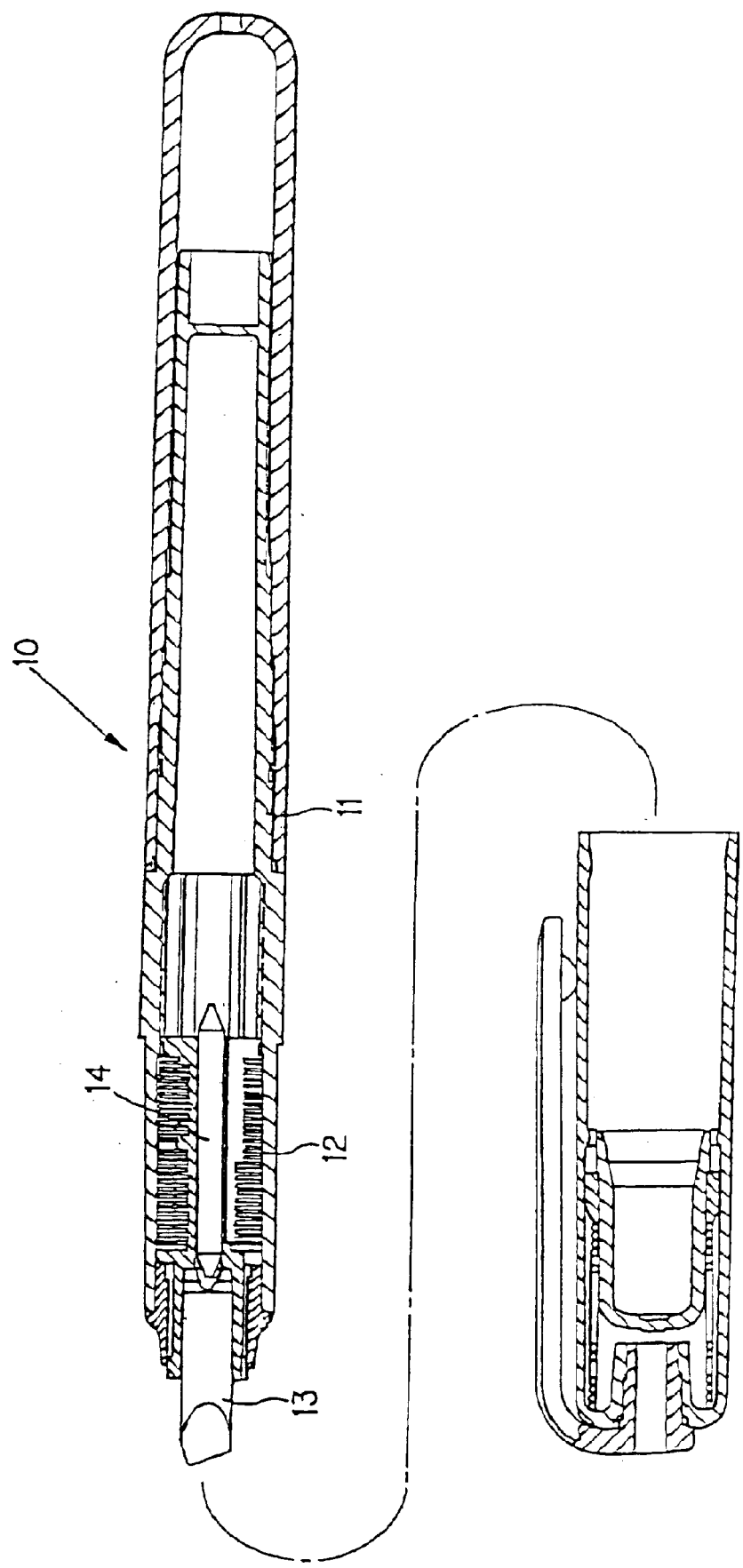
FIG. 1 is an explanatory drawing showing in a cross sectional mode, one example in which the present invention is applied to a free ink type marking pen.
Figure 2:
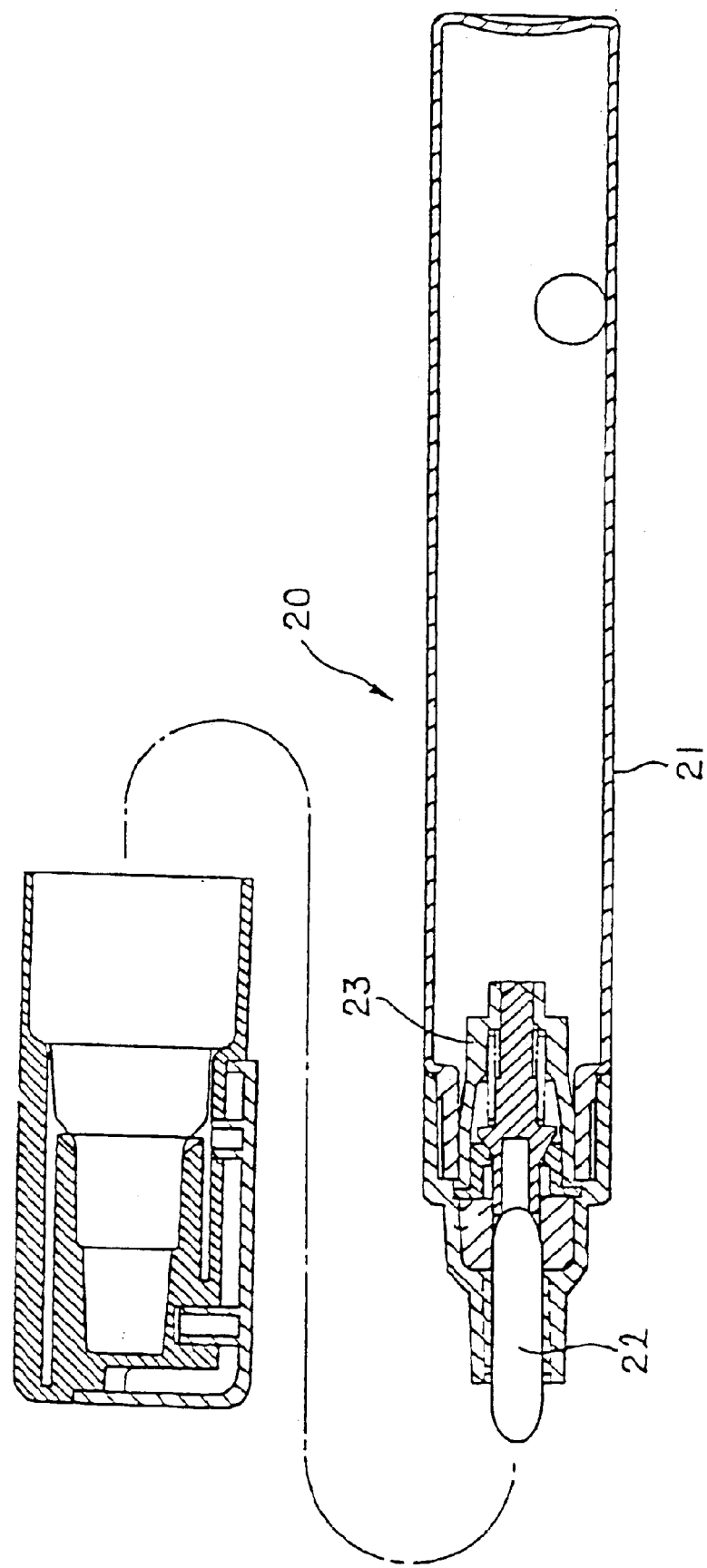
FIG. 2 is an explanatory drawing showing in a cross sectional mode, another example in which the present invention is applied to a marking pen equipped with a valve mechanism.
Figure 3:
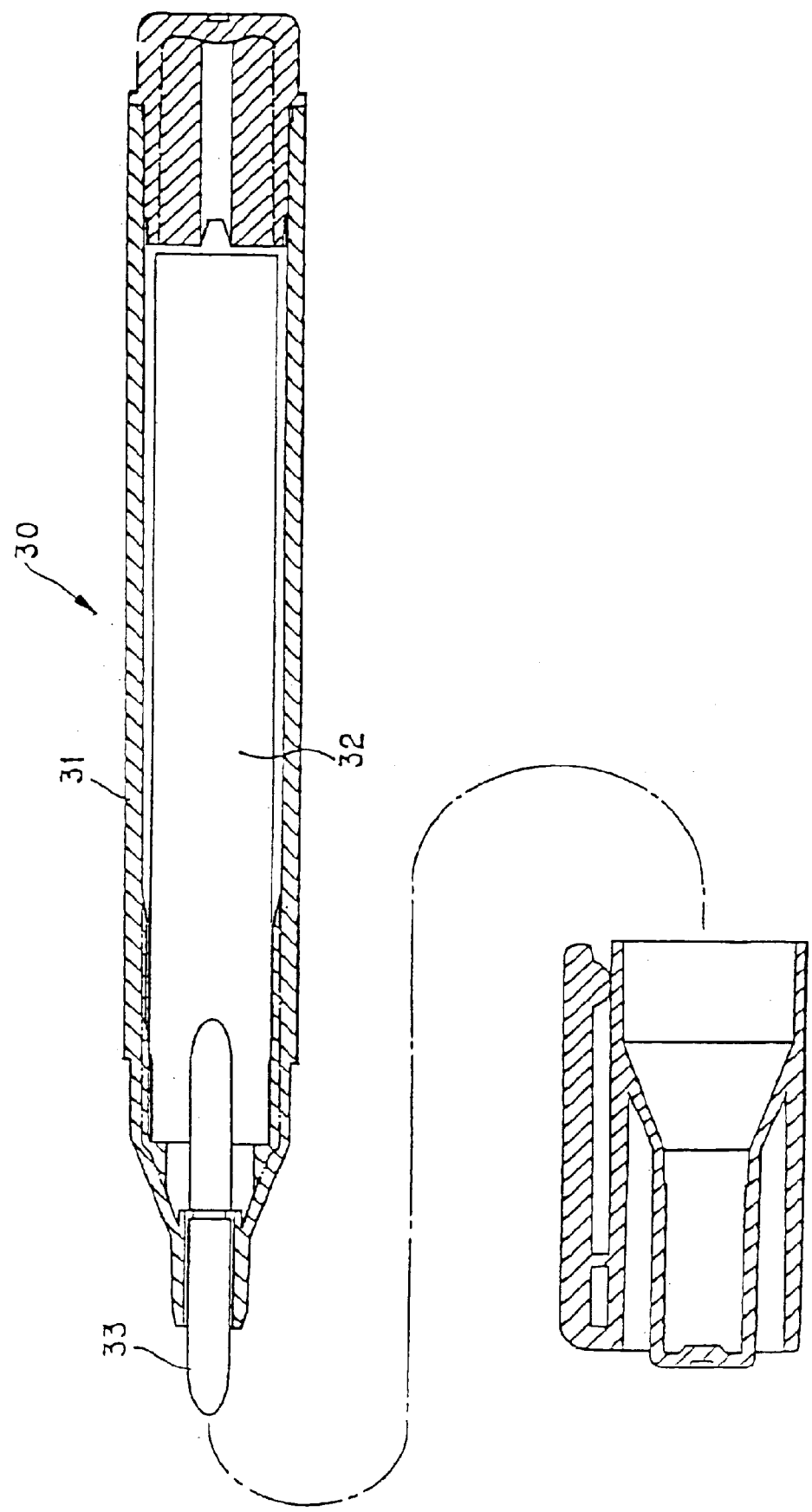
FIG. 3 is an explanatory drawing showing in a cross sectional mode, as another example of the present invention, a marking pen of a type in which an ink is occluded in an ink reservoir such as a sliver.

The marking pen in the present invention shall not specifically be restricted as long as it is a marking pen having a pen tip comprising a fibrous feed or a plastic feed, and it includes, for example, (1) as shown in FIG. 1, a free ink type marking pen 10 which has an ink tank part 11 to be a barrel for directly storing an ink and a collector member 12 for temporarily holding the ink and in which the ink is fed from the ink tank part 11 into a pen tip 13 via a feed 14 (or directly), (2) as shown in FIG. 2, a marking pen 20 which has an ink tank part 21 to be a barrel for directly storing an ink and in which an ink is fed from the ink tank part 21 into a pen tip 22 via a valve mechanism part 23 directly (or via a feed) and (3) as shown in FIG. 3, a marking pen 30 which has an ink reservoir 32 occluding an ink in a barrel 31 and in which the ink is fed from the above ink reservoir 32 into a pen tip 33 directly (or via a feed).

In the present invention, a material, a structure and a production method of the pen tip comprising a fibrous feed or a plastic feed shall not specifically be restricted and include, for example, pen tips comprising fibrous feeds comprising parallel fiber bundles comprising one or a combination of two or more kinds of natural fibers, animal hair fibers, polyacetal base resins, acryl base resins, polyester base resins, polyamide base resins, polyurethane base resins, polyolefin base resins, polyvinyl base resins, polycarbonate base resins, polyether base resins and polyphenylene base resins; fiber feeds of felt and the like prepared by processing fibrous bundles; or fibrous feeds prepared by processing fibrous bundles with resins; plastic feeds comprising the various plastic materials described above and having grooves for ink in an axial direction; and porous bodies obtained by melting and bonding powders of the various plastics described above. The forms thereof include optional ones such as tabular bodies, fiber-converged bodies, sintered bodies and foamed bodies.

The shape of the pen tip used comprising a fibrous feed or a plastic feed shall not specifically be restricted as long as it is a shape usually used for marking pens.

Those having preferably a porosity of 30 to 75% and a slit size, as defined below, of about 1 to 20 $\mu$m are preferred when a fibrous feed is used for the pen tip, and those having an average silt side of 20 to 40 $\mu$m are preferred when a plastic feed is used for the pen tip.

The porosity and the slit size each described above are varied according to the marking pens of the respective types and therefore shall not be restricted to the value ranges described above.

Further, the slit size described above is calculated from the following equation:

slit size=porosity×(radius of yarn)/(1−porosity)

At least a colorant, a solvent, a resin and other additives for a marking pen can be used as the ink components for the marking pen used in the present invention, and in the case of the marking pen for a writing board, an erasability-providing agent is further used.

The colorant includes oil-soluble dyes and pigments, and a pigment is used particularly for the marking pen for a writing board.

Almost all of conventional oil-soluble dyes which can be dissolved in organic solvents can be used as the oil-soluble dyes.

The dyes include, for example, Orazol Yellow 2GLN, Orazol Red 3GL, Orazol Blue 2GLN, Neonzapon Blue FLE, Spirit Black SP, Valifast Red 1308, Oil Blue BA, Oil Yellow 185, Oil Red TR71, Oil Black S, Victoria Blue, Rhodamine 6JHSA and Flex Yellow 105, and the pigments shall not specifically be restricted and include, for example, organic pigments such as azo base pigments, condensed polyazo base pigments, phthalocyanine base pigments, metal complex salt pigments, thioindigo pigments, dye lake pigments and fluorescent pigments, and inorganic pigments such as carbon black and titanium oxide. Further, capable of being used as well are processed pigments the surfaces of which are processed by coating resins, for example, various Microlys A types, AS Black, AS Blue and IK Red. These colorants can be used alone or in a mixture of two or more kinds thereof. A use amount thereof varies depending on the kind of the colorant and the other ink components, and it is 1 to 30% by weight, preferably 2 to 15% by weight based on the total amount of the ink.

The solvent which can be used in the present invention includes, for example, lower alcohols such as ethyl alcohol, propyl alcohol and isopropyl alcohol, aromatic hydrocarbons such as toluene and xylene, lower aliphatic ketones such as methyl ethyl ketone and methyl isobutyl ketone, lower alcohol esters of lower fatty acids such as ethyl acetate and butyl acetate, aliphatic hydrocarbons such as hexane and heptane, alicyclic hydrocarbons such as cyclohexane and ethylcyclohexane and glycol ethers such as propylene glycol monomethyl ether.

These solvents each can be used alone or in a mixture of two or more kinds thereof. A use amount thereof is 50 to 90% by weight, preferably 70 to 85% by weight based on the total amount of the ink.

The resin which can be used in the present invention is a resin which can be dissolved in a solvent and used as a film-forming agent, a sticking agent onto a face to be coated, a viscosity-controlling agent for the ink and a dispersant for the colorant, and various natural resins and synthetic resins which have so far been used can be used. It includes, for example, rosin base resins such as rosin, ester gums, maleic acid-modified rosin and phenol-modified rosin, cellulose base resins such as ethyl cellulose and nitrocellulose, vinyl base resins such as polyvinylbutyral and vinyl chloride-vinyl acetate copolymer resins, petroleum base resins, ketone base resins, acryl base resins, condensation products of aldehyde and urea and a maleic acid resin. They can be used alone or in a mixture of two or more kinds thereof, and a use amount thereof is 0.1 to 30% by weight, preferably 1 to 20% by weight based on the total amount of the ink.

The erasability-providing agent which can be used for the marking pen for a writing board shall not specifically be restricted as long as it is an erasability-providing agent used for a marking pen for a writing board. It includes preferably at least one (alone or a mixture of two or more kinds thereof) selected from substances such as alcohols, acids, esters and ethers each having an alkyl group having 4 or more carbon atoms, and they can provide the good erasability.

Used in order to obtain further better erasability is the erasability-providing agent having a vapor pressure of 0.1 mm Hg or less, preferably 0.5 mm Hg or less and more preferably 0.01 mm Hg at 20° C.

The specific substances of alcohols, acids, esters and ethers each having an alkyl group having 4 or more carbon atoms include, for example, n-octyl alcohol, n-decyl alcohol, lauryl alcohol, myristyl alcohol, cetyl alcohol, stearyl alcohol, cetyl octanoate, 2-methylpentadecyl octanoate, stearyl octanoate, isostearyl octanoate, 2-octyldodecyl 2,2-imethyloctanoate, isostearyl laurate, cetyl isooctanoate, 2-methylpentadecyl myristate, propyl myristate, butyl palmitate, 2-methylpentadecyl palmitate, butyl stearate, butyl isostearate, isooctyl stearate, dioctyl dodecanedioate, dipropyl adipate, dioctyl sebacate, dioctyl azelate, propylene glycol monostearate, pentaerythritol tetraoctanoate, pentaerythritol tetra caproate, pentaerythritol tetracaprate, pentaerythritol tetracaprylate, pentaerythritol tetralaurate, pentaerythritol tetrastearate, polyoxyethylene alkyl ether phosphoric acid esters, polyoxyethylene alkylphenyl ether phosphoric acid esters, polyoxyethylene alkyl ether sulfuric acid esters, polyoxyethylene alkylphenyl ether sulfuric acid esters, polyoxyethylene alkyl ethers, polyoxyethylene phenyl ether and polyoxyethylene fatty acid esters. They can be used alone or in a mixture of two or more kinds thereof.

A use amount of these erasability-providing agents is 1 to 25% by weight, preferably 2 to 20% by weight and more preferably 5 to 15% by weight based on the total amount of the ink.

If substances (alcohols, acids, esters and ethers) having an alkyl group having less than 4 carbon atoms are used, they are volatilized from drawn lines which have been left standing over a long period of time, and the drawn lines can not be clearly erased in a certain case. However, if the erasability-providing agent comprising the substances (alcohols, acids, esters and ethers) having an alkyl group having 4 or more carbon atoms are used, they are not volatilized even after left standing over a long period of time, and the drawn lines can clearly erased.

The substance providing a pen tip with a cap-off performance which is used in the present invention has to contain petroleum waxes comprising hydrocarbons having side chains as a principal component.

The petroleum waxes comprising hydrocarbons having side chains as a principal component used in the present invention include, for example, waxes comprising as a principal component, hydrocarbons having an alkyl group, a phenyl group and a cyclo ring as side chains and having a molecular weight of 300 to 700 and 20 to 50 carbon atoms.

In the present invention, the substance providing a pen tip with a cap-off performance comprises hydrocarbon having a side chain as a principal component, and therefore this hydrocarbon having a side chain has a content of 50% by weight or more, preferably 70% by weight or more based on the total amount of the petroleum waxes. If this hydrocarbon having a side chain has a content of less than 50% by weight, the effect of providing a cap-off property is low, and the effects of the present invention can not be achieved.

The petroleum waxes described above comprising hydrocarbons having side chains as a principal component are preferably those which have a melting point of 63° C. or lower and are solid at room temperature, more preferably those which have a melting point of 58° C. or lower and particularly preferably those which have a melting point of 40 to 53° C. and are solid at room temperature.

The petroleum waxes comprising hydrocarbons having side chains as a principal component which have a melting point of 63° C. or lower and are solid at room temperature have further excellent crystallinity for producing microcrystals and allow the wax to be uniformly spread when forming a coating film to from the coating film having no gaps, and the particularly excellent cap-off performance can be achieved.

In the first invention of the present invention, the substance providing a cap-off performance comprises the petroleum waxes described above comprising hydrocarbons having side chains as a principal component, and a substance providing a cap-off performance other than the petroleum waxes having this characteristic may be used (used in combination) as long as the effects of the present invention are not damaged.

The other usable substances providing a cap-off property include, for example, one or a mixture of two or more kinds selected from the group consisting of glycerin derivatives such as diglycerin monostearate, triglycerin monostearate, pentaglycerin tristearate, hexaglycerin tristearate and decaglycerin distearate, alkylphosphoric acid esters such as polyoxyethylene stearylphosphate, polyoxyethylenesorbitan fatty acid esters such as polyoxyethylenesorbitan monostearate and polyoxyethylenesorbitan tristearate, polyoxyethylenesorbit fatty acid esters such as polyoxyethylenesorbit hexastearate, paraffin waxes, microcrystalline waxes, pentaerythritol derivatives such as pentaerythritol monostearate and pentaerythritol distearate, lecithin, saccharose esters, polyolefin waxes and ascorbic acid stearate. These substances have a content of 50% by weight or less, preferably 0 to 30% by weight based on the total amount of the substance providing a cap-off property (coating agent).

In the first invention of the present invention, a method for coating the fibrous feed or the plastic feed with the coating agent comprising the petroleum waxes having the characteristic described above can be carried out by, for example, dissolving the substance described above in a solvent capable of dissolving it, subjecting the fibrous feed or the plastic feed to dipping treatment in the solution or spraying treatment with it and then drying by heating or at room temperature. When the solubility is extremely low, the substance can be coated by dipping the feed in the heated solution and cooling it.

The solvents for dissolving the substance (coating agent) providing a cap-off performance such as the petroleum waxes having the characteristics described above include, for example, alcohols such as methyl alcohol, ethyl alcohol, n-propyl alcohol and isopropyl alcohol, glycols such as ethylene glycol monomethyl ether, ethylene glycol monoethyl ether and propylene glycol monomethyl ether, ketones such as acetone and methyl ethyl ketone, esters such as methyl acetate, ethyl acetate, butyl acetate, ethylene glycol monomethyl ether acetate and propylene glycol monoethyl ether acetate, ethers such as dimethyl ether and diethyl ether, hydrocarbons such as hexane, isohexane, heptane and methylcyclohexane, and chlorinated compounds such as chloroform and methylene chloride.

An amount of the foregoing substance (coating agent) providing a cap-off performance coated on the fibrous feed or the plastic feed is 0.01 to 20% by weight, preferably 0.1 to 10% by weight and more preferably 0.3 to 5% by weight in terms of a weight ratio based on the fibrous feed or the plastic feed.

If the coating amount is less than 0.01% by weight, the effects brought about by coating can not be achieved. On the other hand, if it exceeds 20% by weight, the substance having a vaporization-inhibiting function is coated too much on the fibrous feed or the plastic feed, and the functions which have to be exerted primarily by the fibrous feed or the plastic feed are damaged. Thus, the ink is less likely to be discharged to bring about starving, and therefore neither of the amounts is preferred.

The other additives for a marking pen include, for example, anionic, nonionic and cationic surfactants, preservatives, fungicides, rust preventives, lubricants and pH-controlling agents.

In the marking pen of the first invention thus constituted, the fibrous feed or the plastic feed is coated with the petroleum waxes having the characteristic described above, whereby the petroleum waxes can uniformly be spread over the surface part of the fibrous feed or the plastic feed to form a fragile coating film having no gaps and this coating film prevents the solvent, which is a volatile component contained in the ink, from vaporizing. The above coating film is broken by writing pressure in writing to allow a pen to write. In addition, the petroleum waxes described above comprising hydrocarbons having side chains as a principal component coated on the fibrous feed or the plastic feed of the pen tip is dissolved again in the ink only by a required amount, though the dissolved amount is a little different depending on the coated amount described above, and then a new coating film is formed on the pen tip surface by virtue of interaction with the ink solvent when the pen tip is exposed to the air next time. This film formation→writing→film formation→writing - - - can be repeated many times, that is, the coating film is always reproduced at the pen tip and broken in writing. This effect shall be repeated until the ink filled in the ink tank part or occluded in the ink reservoir is exhausted.

Next, in the marking pen having an excellent cap-off performance in the second invention of the present invention, the petroleum waxes comprising hydrocarbons having side chains having the characteristic described above as a principal component are added to the ink comprising the ink components for the marking pen, that is, at least the colorant, the solvent and the resin each described above without coating the pen tip comprising the fibrous feed or the plastic feed with the coating agent comprising the substance providing a cap-off property, whereby the intended cap-off performance is exerted.

The petroleum waxes comprising hydrocarbons having side chains as a principal component have a content of 0.03 to 10% by weight, preferably 0.05 to 8% by weight and more preferably 0.1 to 5% by weight based on the total amount of the ink.

If the petroleum waxes have a content of less than 0.01% by weight, the effects of the present invention can not be achieved. On the other hand, if it exceeds 10% by weight, deposits shall be produced in the ink while pens are stored at a low temperature or exposed repeatedly to low and high temperatures, thereby causing clogging in the ink passage to reduce the writing property or deteriorate the cap-off performance with the passage of time. Accordingly, neither of the amounts is preferred.

In the marking pen of the second invention of the present invention thus constituted, the physical properties of the ink shall not be damaged even if the petroleum waxes having the characteristic described above are contained in the ink for the marking pen comprising at least the colorant, the solvent and the resin and, if necessary, the erasability-providing agent, and the petroleum waxes added to the ink form a fragile coating film having no gaps on the surface part of the fibrous feed or the plastic feed. This coating film prevents the solvent, which is a volatile component contained in the ink, from vaporizing. The above coating film is broken by writing pressure in writing to allow a pen to write on a writing member. In addition, though the film structure is a little different depending on the content of the petroleum waxes contained in the ink, a new coating film is formed on the pen tip surface by virtue of interaction with the ink solvent when the pen tip is exposed to the air next time, and this film formation→writing→film formation→writing - - - can be repeated many times, that is, the coating film is always reproduced at the pen tip and broken in writing. This effect shall be repeated until the ink filled in the ink tank part or occluded in the ink reservoir is exhausted.

It is a matter of course that the marking pen of the present invention shall not be restricted to the embodiments described above and that it can be changed to various forms as long as the scope of the present invention is not changed.

In the first invention of the present invention, the pen tip is coated with the coating agent comprising the petroleum waxes comprising hydrocarbons having side chains having the characteristic described above as a principal component. However, in addition to this coating, the petroleum waxes comprising hydrocarbons having side chains described above as a principal component can further be added, as is the case with the second invention described above, to the ink comprising at least the colorant, the solvent and the resin each described above together.

A content of the petroleum waxes comprising hydrocarbons having side chains as a principal component can be lower than the content in the second invention described above since the above petroleum waxes are already coated as well on the pen tip, and it is about 0.01 to 5% by weight based on the total amount of the ink.

EXAMPLES

Next, the present invention shall more specifically be explained in details with reference to examples and comparative examples, but the present invention shall not be restricted to the following examples.

The following pen tip and substances providing a cap-off property were used in the examples of the present invention and the comparative examples.

1. Pen Tip

Used as a pen tip was a pen feed comprising a sliver of an acryl fiber and having a weight of 0.17 g, a length of 33 mm and a diameter of 4.0 mm (porosity: 55%).

2. Substances Providing a Cap-off Property (Coating Agent)

Used as the substance providing a cap-off property (coating agent) were (1) petroleum wax (molecular weight: 422) comprising hydrocarbon as a principal component having a side chain ratio of 80% (functional groups of a side chain: methyl, cyclopentyl and phenyl), a melting point of 65° C. and 34 carbon atoms, (2) petroleum wax (molecular weight: 394) comprising hydrocarbon as a principal component having a side chain ratio of 70% (functional groups of a side chain: methyl, cyclopentyl and phenyl), a melting point of 62° C. and 32 carbon atoms, (3) petroleum wax (molecular weight: 450) comprising hydrocarbon as a principal component having a side chain ratio of 90% (functional groups of a side chain: methyl, cyclopentyl and methylcyclohexyl), a melting point of 50° C. and 28 carbon atoms, (4) petroleum wax (molecular weight: 352) comprising hydrocarbon as a principal component having a side chain ratio of 5% (functional group of a side chain: methyl), a melting point of 60° C. and 27 carbon atoms and (5) diglycerin monostearate.

These respective petroleum waxes of (1) to (5) were solid at room temperature.

Next, a cap-off performance and a long range erasability of the marking pens prepared in the examples of the present invention and the comparative examples were evaluated by the following methods.

1. Evaluating Method of the Cap-off Performance

The respective marking pens prepared in the respective examples and comparative examples were left standing in a room of a temperature of 25° C. and a humidity of 65% to evaluate a writing performance at 25° C. according to the following criteria relative to the passage of time in a cap-off state with the cap taken off.

Evaluation Criteria:

⊚: writable without starving
○: slightly starving at the beginning of writing
Δ: starving in the first line
ΔΔ: starving also in the second line
X: unwritable 2. Evaluating Method of the Long Range Erasability The respective marking pens for a writing board prepared in Examples 12 to 26 and Comparative examples 6 to 10 were used for writing on a white board at 25° C., and a long range erasability of the drawn lines, that is, the long range erasability observed after the drawn lines on the white board were left standing at a temperature of 25° C. and a humidity of 65% for one month, 2 months and 3 months was evaluated according to the following criteria.

⊚: clearly erasable
○: erasable
Δ: traces of the drawn lines remain
x: inerasable Examples 1 to 11 and Comparative Examples 1 to 5

The respective inks having the blend compositions (blend unit: % by weight) of I-1 to I-5 shown in the following Table 1 were used as inks for the marking pens.

In respect to the coating method, the substance providing a cap-off property described above (the coating agent) was dissolved in methylene chloride, which was a solvent, to prepare a 3% solution, and the pen tip described above was dipped in the solution and continued to be dipped at 50° C. for 2 hours. Then, the pen tip was pulled up and put on a mesh-like vessel, and it was dried at 50° C. for a whole day and night (24 hours) to remove the solvent.

An amount of the coating agent adhered on the pen tip was represented by a difference in a weight of the ink reservoir before and after the treatment and shown by a weight % based on the weight of the pen feed before the treatment.

Used were the pen feeds A to E which were subjected to treatments shown outside the column in the following Table 2 and a (untreated). In the pen feed E, the pen feed was subjected to dipping treatment in a mixture of the coating agents (1) and (5) described above.

Marking pens of a sliver type shown in FIG. 3 were obtained from the inks (4.5 g) described above and the pen feeds.

The respective marking pens were used to evaluate a cap-off performance, that is, a writing performance relative to the passage of cap-off time.

The results thereof are shown in the following Table 2.

TABLE 1

| Ink blend composition | I-1 | I-2 | I-3 | I-4 | I-5 |
|---|---|---|---|---|---|
| Ethyl alcohol | 75 | — | 74 | 74 | — |
| n-Propanol | — | 50 | — | — | 50 |
| i-Propanol | 7.5 | — | 7.5 | 7.5 | — |
| Propylene glycol monomethyl ether | — | 34 | — | — | 33 |
| Laropearl A101*[1] | — | 12 | — | — | 12 |
| Alresat KM400*[2] | 10 | — | 10 | 10 | — |
| Victoria Blue BSA*[3] | 2.5 | 3 | 2.5 | 2.5 | 3 |
| Rhodamine 6JHSA*[4] | 2.5 | 1 | 2.5 | 2.5 | 1 |
| Flex Yellow 105*[5] | 2.5 | — | 2.5 | 2.5 | — |
| Coating agent (2)*[6] | — | — | 1 | — | — |
| Coating agent (3)*[7] | — | — | — | 1 | — |
| Coating agent (4)*[8] | — | — | — | — | 1 |

*[1]Condensation product of aldehyde and urea (manufactured by BASF AG.)
*[2]Maleic acid resin (manufactured by Hoechst AG.)
*[3]Dye (manufactured by Zeneca Co., Ltd.)
*[4]Dye (manufactured by Zeneca Co., Ltd.)
*[5]Dye (manufactured by Zeneca Co., Ltd.)
*[6]Petroleum wax comprising as a principal component hydrocarbon having a side chain ratio of 70%, a melting point of 62° C. and 32 carbon atoms
*[7]Petroleum wax comprising as a principal component hydrocarbon having a side chain ratio of 90%, a melting point of 50° C. and 28 carbon atoms
*[8]Petroleum wax comprising as a principal component hydrocarbon having a side chain ratio of 5%, a melting point of 60° C. and 27 carbon atoms

TABLE 2

Cap-off performance evaluation results

| | Pen feed | Ink in Table 1 | Writing performance evaluation relative to passage of cap-off time | | | | | | |
|---|---|---|---|---|---|---|---|---|---|
| | | | 1 day | 3 days | 1 week | 2 weeks | 1 month | 1.5 month | 2 months |
| Example 1 | a | I-3 | ◎ | ◎ | ◎ | ◎ | ◎ | ◎ | ○ |
| Example 2 | a | I-4 | ◎ | ◎ | ◎ | ◎ | ◎ | ◎ | ○ |
| Example 3 | A | I-1 | ◎ | ◎ | ◎ | ◎ | ◎ | ◎ | ○ |
| Example 4 | A | I-2 | ◎ | ◎ | ◎ | ◎ | ◎ | ◎ | ○ |
| Example 5 | B | I-1 | ◎ | ◎ | ◎ | ◎ | ◎ | ◎ | ◎ |
| Example 6 | B | I-2 | ◎ | ◎ | ◎ | ◎ | ◎ | ◎ | ◎ |
| Example 7 | C | I-1 | ◎ | ◎ | ◎ | ◎ | ◎ | ◎ | ◎ |
| Example 8 | C | I-2 | ◎ | ◎ | ◎ | ◎ | ◎ | ◎ | ◎ |
| Example 9 | E | I-1 | ◎ | ◎ | ◎ | ◎ | ◎ | ◎ | ○ |
| Example 10 | E | I-2 | ◎ | ◎ | ◎ | ◎ | ◎ | ◎ | ○ |
| Example 11 | A | I-4 | ◎ | ◎ | ◎ | ◎ | ◎ | ◎ | ◎ |
| Comparative Example 1 | a | I-1 | X | X | | | | | |
| Comparative Example 2 | a | I-2 | X | X | | | | | |
| Comparative Example 3 | a | I-5 | ΔΔ | X | X | | | | |
| Comparative Example 4 | D | I-1 | ◎ | ◎ | ◎ | ◎ | ◎ | ΔΔ | X |
| Comparative Example 5 | D | I-2 | ◎ | ◎ | ◎ | ◎ | ◎ | ◎ | X |

Pen feed:
A: Coating agent (1), adhered amount of 3% based on the weight of fibrous feed
B: Coating agent (2), adhered amount of 3% based on the weight of fibrous feed
C: Coating agent (3), adhered amount of 3% based on the weight of fibrous feed
D: Coating agent (4), adhered amount of 3% based on the weight of fibrous feed
E: Coating agent (1) + Coating agent (5) adhered amount of 3% based on the weight of fibrous feed
(adhered amount of 2.4% + adhered amount of 0.6%)
a: untreated As apparent from the results shown in Table 1 and Table 2 described above, it has been found that the marking pens prepared in Examples 1 to 11 falling in the scope of the present invention are excellent in a cap-off performance in which a good writing performance is achieved as compared with those prepared in Comparative Examples 1 to 5 falling outside the scope of the present invention even after the pen tips are left standing in the air over a long period of time.

Individually observing the examples, in Examples 1 and 2, the petroleum waxes having characteristics meeting the present invention were added to the inks, and in Examples 3 to 11, the coating agents comprising the petroleum waxes having the characteristics meeting the present invention were coated respectively on the pen tips. In particular, in Examples 9 and 10, the coating agents further comprising the other substance providing a cap-off property in addition to the petroleum waxes having the characteristics meeting the present invention were coated on the pen tips; and in Example 11, the petroleum waxes having the characteristics meeting the present invention were added to the inks, and the coating agent comprising the petroleum waxes having the characteristics meeting the present invention was coated on the pen tip.

In contrast with this, to observe the comparative examples, Comparative Examples 1 and 2 are the marking pens of conventional embodiments; in Comparative Example 3, an untreated pen tip is used, and petroleum waxes in which hydrocarbon having side chains is not a principal component (less than 50% by weight) are contained in the ink; and in Comparative Examples 4 and 5, the pen tips are coated with the coating agents comprising petroleum waxes in which hydrocarbon having side chains is not a principal component (less than 50% by weight).

To totally evaluate these Examples 1 to 11 and Comparative Examples 1 to 5, it has been found that the marking pens according to the present invention in which the petroleum waxes having the characteristics meeting the present invention are added to the inks, the marking pens in which the coating agents comprising the petroleum waxes having the characteristics meeting the present invention are coated on the pen tips and the marking pens which are the composite types thereof are those which are excellent in a cap-off performance and in which a good writing performance is achieved even after the pen tips are left standing in the air over a long period of time as compared with the marking pens which are of conventional embodiments, the marking pens using the inks containing petroleum waxes in which hydrocarbon having side chains is not a principal component (less than 50% by weight) and the marking pens coated on the pen tips with the coating agents comprising petroleum waxes in which hydrocarbon having side chains is not a principal component (less than 50% by weight).

Examples 12 to 26 and Comparative Examples 6 to 10

The respective inks having the blend compositions (blend unit: % by weight) of I-6 to I-14 shown in the following Table 3 were used as inks for the marking pens.

In respect to the coating method, the substance providing a cap-off property described above (the coating agent) was dissolved in methylene chloride, which was a solvent, to prepare a 3% solution, and the pen tip described above was dipped in the solution and continued to be dipped at 50° C. for 2 hours. Then, the pen tip was pulled up and put on a mesh-like vessel, and it was dried at 50° C. for a whole day and night (24 hours) to remove the solvent.

An amount of the coating agent adhered on the pen tip was represented by a difference in a weight of the ink reservoir before and after the treatment and shown by a weight % based on the weight of the pen feed before the treatment.

Used were the pen feeds A to E which were subjected to treatments shown outside the column in the following Table 4 and a (untreated). In the pen feed E, the pen feed was subjected to dipping treatment in a mixture of the coating agents (1) and (5) described above.

Marking pens of a sliver type for a writing board shown in FIG. 3 were obtained from the inks (4.5 g) described above and the pen feed.

The respective marking pens for a writing board were used to evaluate a cap-off performance and a long range erasability.

The results thereof are shown in the following Table 4.

TABLE 3

| | Ink blend composition | | | | | | | | |
|---|---|---|---|---|---|---|---|---|---|
| Ink | I-6 | I-7 | I-8 | I-9 | I-10 | I-11 | I-12 | I-13 | I-14 |
| Ethyl alcohol | 72.5 | — | 72.5 | — | 72.5 | — | 71.5 | 71.5 | — |
| n-Propanol | — | 14.0 | — | 14.0 | — | 14.0 | — | — | 14.0 |
| i-Propanol | 7.5 | — | 7.5 | — | 7.5 | — | 7.5 | 7.5 | — |
| Propylene glycol monomethyl ether | — | 66.0 | — | 66.0 | — | 66.0 | — | — | 65.0 |
| Poly(vinyl butyral) | 5.0 | 5.0 | 5.0 | 5.0 | 5.0 | 5.0 | 5.0 | 5.0 | 5.0 |
| Carbon black | 4.0 | — | 4.0 | — | 4.0 | — | 4.0 | 4.0 | — |
| Phthalocyanine blue | — | 4.0 | — | 4.0 | — | 4.0 | — | — | 4.0 |
| Erasability-providing agent (1)*[1] | 11.0 | 11.0 | — | — | — | — | 11.0 | 11.0 | 11.0 |
| Erasability-providing agent (2)*[2] | — | — | 11.0 | 11.0 | — | — | — | — | — |
| Erasability-providing agent (3)*[3] | — | — | — | — | 11.0 | 11.0 | — | — | — |
| Coating agent (2)*[4] | — | — | — | — | — | — | 1.0 | — | — |
| Coating agent (3)*[5] | — | — | — | — | — | — | — | 1.0 | — |
| Coating agent (4)*[6] | — | — | — | — | — | — | — | — | 1.0 |

*[1]Substance (stearyl alcohol) having an alkyl group having 4 or more carbon atoms and a vapor pressure (20° C.) of 0.1 mm Hg or less
*[2]Substance (2-ethyl-1-hexanol) having an alkyl group having 4 or more carbon atoms and a vapor pressure (20° C.) of exceeding 0.1 mm Hg
*[3]Substance (ethyl propionate) having an alkyl group having less than 4 carbon atoms
*[4]Petroleum wax comprising as a principal component hydrocarbon having a side chain ratio of 70%, a melting point of 62° C. and 32 carbon atoms
*[5]Petroleum wax comprising as a principal component hydrocarbon having a side chain ratio of 90%, a melting point of 50° C. and 28 carbon atoms
*[6]Petroleum wax comprising as a principal component hydrocarbon having a side chain ratio of 5%, a melting point of 60° C. and 27 carbon atoms

TABLE 4

Cap-off performance evaluation results

| | | | Writing performance evaluation relative to passage of cap-off time | | | | | | | Long range erasability evaluation | |
|---|---|---|---|---|---|---|---|---|---|---|---|
| | Pen feed | Ink in Table 3 | One day | 3 days | One week | 2 weeks | One month | 1.5 month | 2 months | One month | 2 months |
| Example 12 | a | I-12 | ⊙ | ⊙ | ⊙ | ⊙ | ○ | Δ | Δ | ⊙ | ⊙ |
| Example 13 | a | I-13 | ⊙ | ⊙ | ⊙ | ⊙ | ⊙ | ○ | Δ | ⊙ | ⊙ |
| Example 14 | A | I-6 | ⊙ | ⊙ | ⊙ | ⊙ | ⊙ | ○ | Δ | ⊙ | ⊙ |
| Example 15 | A | I-7 | ⊙ | ⊙ | ⊙ | ⊙ | ⊙ | Δ | Δ | ⊙ | ⊙ |
| Example 16 | B | I-6 | ⊙ | ⊙ | ⊙ | ⊙ | ⊙ | ⊙ | ○ | ⊙ | ⊙ |
| Example 17 | B | I-7 | ⊙ | ⊙ | ⊙ | ⊙ | ⊙ | ⊙ | Δ | ⊙ | ⊙ |
| Example 18 | C | I-6 | ⊙ | ⊙ | ⊙ | ⊙ | ⊙ | ⊙ | ⊙ | ⊙ | ⊙ |
| Example 19 | C | I-7 | ⊙ | ⊙ | ⊙ | ⊙ | ⊙ | ⊙ | ⊙ | ⊙ | ⊙ |
| Example 20 | E | I-6 | ⊙ | ⊙ | ⊙ | ⊙ | ⊙ | ⊙ | ○ | ⊙ | ⊙ |
| Example 21 | E | I-7 | ⊙ | ⊙ | ⊙ | ⊙ | ⊙ | ⊙ | ○ | ⊙ | ⊙ |
| Example 22 | B | I-8 | ⊙ | ⊙ | ⊙ | ⊙ | ⊙ | ⊙ | ○ | ⊙ | ○ |
| Example 23 | B | I-9 | ⊙ | ⊙ | ⊙ | ⊙ | ⊙ | ⊙ | Δ | ⊙ | ○ |
| Example 24 | B | I-10 | ⊙ | ⊙ | ⊙ | ⊙ | ⊙ | ⊙ | ○ | ○ | Δ |
| Example 25 | B | I-11 | ⊙ | ⊙ | ⊙ | ⊙ | ⊙ | ⊙ | Δ | ○ | Δ |
| Example 26 | A | I-12 | ⊙ | ⊙ | ⊙ | ⊙ | ⊙ | ⊙ | ⊙ | ⊙ | ⊙ |
| Comparative Example 6 | a | I-6 | X | X | | | | | | ⊙ | ⊙ |
| Comparative Example 7 | a | I-7 | X | X | | | | | | ⊙ | ⊙ |
| Comparative Example 8 | a | I-14 | ΔΔ | X | X | | | | | ⊙ | ⊙ |
| Comparative Example 9 | D | I-6 | ○ | Δ | ΔΔ | X | X | | | ⊙ | ⊙ |

TABLE 4-continued

Cap-off performance evaluation results

|  | Pen feed | Ink in Table 3 | Writing performance evaluation relative to passage of cap-off time | | | | | | Long range erasability evaluation | |
|---|---|---|---|---|---|---|---|---|---|---|
|  |  |  | One day | 3 days | One week | 2 weeks | One month | 1.5 month | 2 months | One month | 2 months |
| Comparative Example 10 | D | I-7 | ◎ | ○ | Δ | ΔΔ | X | X |  | ◎ | ◎ |

Pen feed
A: Coating agent (1), adhered amount of 3% based on the weight of fibrous feed
B: Coating agent (2), adhered amount of 3% based on the weight of fibrous feed
C: Coating agent (3), adhered amount of 3% based on the weight of fibrous feed
D: Coating agent (4), adhered amount of 3% based on the weight of fibrous feed
E: Coating agent (1) + Coating agent (5) adhered amount of 3% based on the weight of fibrous feed (adhered amount of 2.4% + adhered amount of 0.6%)
a: untreated As apparent from the results shown in Table 3 and Table 4 described above, it has been found that the marking pens prepared in Examples 12 to 26 falling in the scope of the present invention are marking pens for a writing board having an excellent cap-off performance in which a good writing performance is achieved as compared with those prepared in Comparative Examples 6 to 10 falling outside the scope of the present invention even after the pen tips are left standing over a long period of time and that lines drawn on a white board can clearly be erased even after the drawn lines are left standing as they are over a long period of time.

Individually observing the examples, in Examples 12 and 13, the petroleum waxes having the characteristics meeting the present invention were added to the inks, and in Examples 14 to 25, the coating agents comprising the petroleum waxes having the characteristics meeting the present invention were coated respectively on the pen tips. In particular, in Examples 20 and 21, the coating agents further comprising the other substance providing a cap-off property in addition to the petroleum waxes having the characteristics meeting the present invention were coated on the pen tips; in Examples 22 and 23, the erasability-providing agents having a vapor pressure of 0.1 mm Hg or more were used; and in Examples 24 and 25, substances having an alkyl group having less than 4 carbon atoms were used as the erasability-providing agent. In Example 26, the petroleum waxes having the characteristics meeting the present invention were added to the ink, and the coating agent comprising the petroleum waxes having the characteristics meeting the present invention was coated on the pen tip.

In contrast with this, to observe the comparative examples, Comparative Examples 6 and 7 are the marking pens for a writing board of conventional embodiments; in Comparative Example 8, an untreated pen tip is used, and petroleum waxes in which hydrocarbon having side chains is not a principal component (less than 50% by weight) are contained in the ink; and in Comparative Examples 9 and 10, the pen tips are coated with the coating agents comprising petroleum waxes in which hydrocarbon having side chains is not a principal component (less than 50% by weight).

To totally evaluate these Examples 12 to 26 and Comparative Examples 6 to 10, it has been found that the marking pens for a writing board according to the present invention in which the petroleum waxes having the characteristics meeting the present invention are added to the inks, the marking pens in which the coating agents comprising the petroleum waxes having the characteristics meeting the present invention are coated on the pen tips and the marking pens which are the composite types thereof are those which are excellent in a cap-off performance and in which a good writing performance is achieved even after the pen tips are left standing in the air over a long period of time as compared with the marking pens which are of conventional embodiments, the marking pens using the inks containing petroleum waxes in which hydrocarbon having side chains is not a principal component (less than 50% by weight) and the marking pens coated on the pen tips with the coating agents comprising petroleum waxes in which hydrocarbon having side chains is not a principal component (less than 50% by weight).

It has been found that particularly in Examples 12 to 21, use of at least one which is selected from substances having an alkyl group having 4 or more carbon atoms and which has a vapor pressure of 0.1 mm Hg or less at 20° C. as an erasability-providing agent makes it possible to more clearly erase lines drawn on a white board even after the drawn lines are left standing as they are over a long period of time.

INDUSTRIAL APPLICABILITY

According to the present invention, provided is a marking pen having an excellent cap-off performance in which a good writing performance is achieved even after the pen tips are left standing in the air over a long period of time, and it can suitably be applied to conventional markers using oil base inks, high-lighters, sign pens, paint markers, writing brush pens and correction pens.

What is claimed is:

1. A marking pen having an excellent cap-off performance which comprises at least a colorant, a solvent and a resin as ink components and in which a pen tip comprising a fibrous feed or a plastic feed is coated with a coating agent comprising a substance providing a cap-off property, wherein the coating agent comprises petroleum waxes comprising 50% by weight or more of hydrocarbons having side chains.

2. The marking pen having an excellent cap-off performance as described in claim 1, wherein the petroleum waxes comprising 50% by weight or more of hydrocarbons having side chains described above have a melting point of 63° C. or lower and are solid at room temperature.

3. A marking pen for a writing board having an excellent cap-off performance, wherein in the marking pen as described in claim 2, an erasability-providing agent is further involved as the ink component, and the colorant is a pigment.

4. The marking pen for a writing board having an excellent cap-off performance as described in claim 3, wherein the erasability-providing agent described above is at least one selected from substances having an alkyl group having 4 or more carbon atoms.

5. The marking pen for a writing board having an excellent cap-off performance as described in claim 4, wherein the erasability-providing agent has a vapor pressure of 0.1 mm Hg or less at 20° C.

6. The marking pen for a writing board having an excellent cap-off performance as described in claim 3, wherein the erasability-providing agent has a vapor pressure of 0.1 mm Hg or less at 20° C.

7. A marking pen for a writing board having an excellent cap-off performance, wherein in the marking pen as described in claim 1, an erasability-providing agent is further involved as the ink component, and the colorant is a pigment.

8. The marking pen for a writing board having an excellent cap-off performance as described in claim 7, wherein the erasability-providing agent described above is at least one selected from substances having an alkyl group having 4 or more carbon atoms.

9. The marking pen for a writing board having an excellent cap-off performance as described in claim 8, wherein the erasability-providing agent has a vapor pressure of 0.1 mm Hg or less at 200° C.

10. The marking pen for a writing board having an excellent cap-off performance as described in claim 7, wherein the erasability-providing agent has a vapor pressure of 0.1 mm Hg or less at 200° C.

11. A marking pen having an excellent cap-off performance comprising at least a colorant, a solvent and a resin as ink components and having a pen tip comprising a fibrous feed or a plastic feed, wherein petroleum waxes comprising 50% by weight or more of hydrocarbons having side chains are involved in the ink components.

12. The marking pen having an excellent cap-off performance as described in claim 11, wherein the petroleum waxes comprising 50% by weight or more of hydrocarbons having side chains described above have a melting point of 63° C. or lower and are solid at room temperature.

13. A marking pen for a writing board having an excellent cap-off performance, wherein in the marking pen as described in claim 12, an erasability-providing agent is further involved as the ink component, and the colorant is a pigment.

14. The marking pen for a writing board having an excellent cap-off performance as described in claim 13, wherein the erasability-providing agent described above is at least one selected from substances having an alkyl group having 4 or more carbon atoms.

15. The marking pen for a writing board having an excellent cap-off performance as described in claim 14, wherein the erasability-providing agent has a vapor pressure of 0.1 mm Hg or less at 20° C.

16. The marking pen for a writing board having an excellent cap-off performance as described in claim 13, wherein the erasability-providing agent has a vapor pressure of 0.1 mm Hg or less at 20° C.

17. A marking pen for a writing board having an excellent cap-off performance, wherein in the marking pen as described in claim 11, an erasability-providing agent is further involved as the ink component, and the colorant is a pigment.

18. The marking pen for a writing board having an excellent cap-off performance as described in claim 17, wherein the erasability-providing agent described above is at least one selected from substances having an alkyl group having 4 or more carbon atoms.

19. The marking pen for a writing board having an excellent cap-off performance as described in claim 18, wherein the erasability-providing agent has a vapor pressure of 0.1 mm Hg or less at 20° C.

20. The marking pen for a writing board having an excellent cap-off performance as described in claim 17, wherein the erasability-providing agent has a vapor pressure of 0.1 mm Hg or less at 20° C.

* * * * *